July 6, 1926.

H. H. GARNER 1,591,677

EXHAUST CLEARED AIR CLEANER

Filed Dec. 6, 1922

INVENTOR:
HERMAN H. GARNER,
BY
Graham & Harris
ATTORNEYS.

Patented July 6, 1926.

1,591,677

UNITED STATES PATENT OFFICE.

HERMAN H. GARNER, OF POMONA, CALIFORNIA.

EXHAUST-CLEARED AIR CLEANER.

Application filed December 6, 1922. Serial No. 605,259.

This invention relates to an air cleaning attachment which may be employed for cleaning air for various purposes, but which is particularly adapted to attachment to the air intake of an internal combustion engine for the purpose of removing dust from the indrawn air stream so that the dust will not be carried into the interior of the engine.

It is well known that air carries varying amounts of fine dust particles in suspension under ordinary conditions, and that on country roads and in fields where the ground is dry, the amount of dust stirred up by vehicles and by other causes and thus carried in the air is very considerable. A considerable portion of this dust consists of fine abrasive particles which are drawn into the interior of the engine and greatly increase the wear of the moving parts therein with the result that the operating efficiency of the engine is soon affected.

It is the object of my invention to provide an air cleaner in which the heavier dust particles are removed from the stream of air drawn into an internal combustion engine by centrifugal action, and in which the extremely fine particles are removed by bringing the air in contact with oil impregnated surfaces to which the dust particles adhere.

It is a further object of the invention to provide a means whereby the heavier dust particles may be drawn from the centrifugal separation chamber, as they are collected therein.

The especial advantages of my invention and further objects thereof will be made evident hereinafter.

Referring to the drawing which is for illustrative purposes only,

Fig. 2 is an enlarged vertical longitudinal section through the air cleaner shown in Fig. 1.

Fig. 3 is a section taken upon a plane represented by the line 3—3 of Fig. 2.

Figure 1:
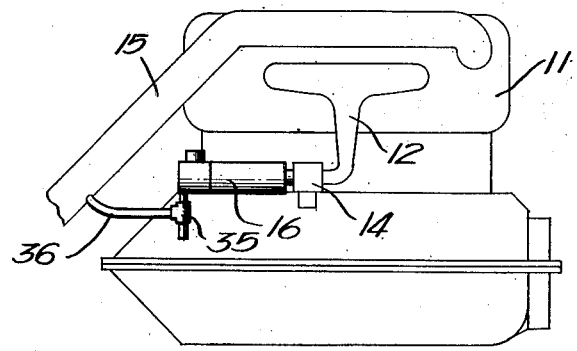
Fig. 1 is a diagrammatic elevational view showing the manner in which an air cleaning device embodying the features of my invention may be applied to an internal combustion engine.
Figure 1:
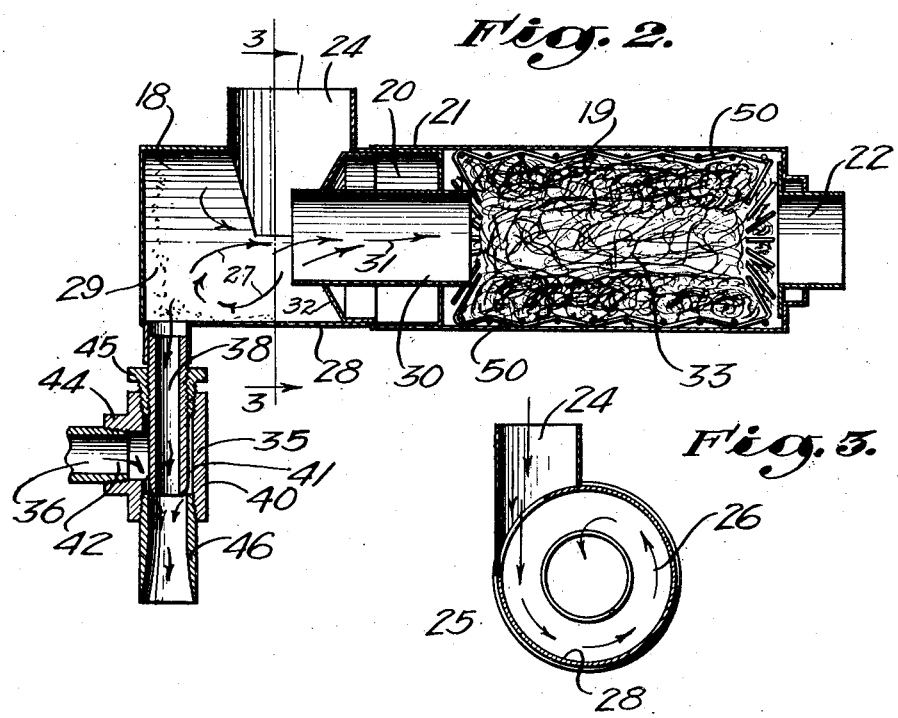

In Fig. 1 of the drawing, 11 represents an internal combustion engine having an intake manifold 12, to which a carburetor 14 is attached, and an exhaust manifold 15. Attached to the intake side of the carburetor 14 is an air cleaner 16 which is formed of a centrifugal separation chamber 18 and a filter chamber 19 which is entirely open at one end thereof, so that it may be placed over the outlet end 20 of the separating chamber 18, as shown at 21, and has an outlet 22 at the other end thereof for connection with the carburetor 14. The inlet of air into the cleaner is attained through an inlet opening 24 which is tangentially disposed, as shown in Fig. 3, so that the air is drawn into the chamber 18 on a tangent, as indicated by the arrows 25, thus causing the air to centrifugate within the chamber 18, as indicated by the arrows 26. By this centrifugal action of the air within the chamber 18, the greater portion of the dust particles are thrown against the outer walls 28 of the chamber 18 and collect in the rearward end 29 of the chamber in the form of a whirling mass of dust, while the air carrying a small quantity of the finer particles of dust is drawn through the axially disposed outlet tube 30, as indicated by the arrows 31, and through a mass of fibrous material 33 which is disposed in the filter chamber 19, and has been wet with a liquid, and is from thence directed through the outlet 22 into the carburetor 14 and thereafter through the intake manifold 12 into the engine 11.

It is preferable to impregnate the filter 33 with a non-volatile oil, as where volatile oils are employed, the passage of air through the filter has the effect of immediately drying out the filter and thus robbing it of the greater portion of its efficiency.

It will be noted that the rear end of the outlet tube 30 extends approximately to a transverse plane intersecting the axis of the inlet opening 24 and it will be evident that in order to enter this outlet tube the centrifugated air will first tend to flow rearward towards the end 29 of the separator chamber, as indicated by the arrow 27, before reversing its direction to flowing through the tube 30. Thus the centrifugated air has a rearward scouring action on the chamber walls 28 which tends to continually urge the dust particles, as they are separated, towards the dust discharge nozzle 38, this rearward movement of the rotating air being augmented by the cone-shaped forward end wall 32.

The dust removed from the air stream in the centrifugal chamber 18 collects very rapidly, and for the purpose of removing this separated dust as it collects, I employ an ejector 35 which is operated by a flow of exhaust gas from the exhaust manifold 15, which exhaust gas is carried to the ejector 35 through a pipe 36. The ejector consists of a nozzle 38 which is connected into the bottom of the chamber 18 at the rearward end 29 thereof, and a casing 40 which provides a space 41 around the lower end of the nozzle through which the exhaust gases from the exhaust manifold are conducted, as indicated by the arrows 42 in Fig. 2. The flow of the exhaust gases past the discharge opening of the nozzle 38 creates a vacuum within the nozzle which draws a small stream of air from the interior of the chamber 18, this air being drawn from the chamber at such a point that it carries off with it, the separated dust particles as they collect.

The ejector I have shown is very simply constructed from a pipe nipple 38 and a T 44 which forms the casing 40 and which is secured upon the pipe nipple forming nozzle 38 by means of bushing 45, there being a short nipple 46 screwed into the lower end of the T 44 to provide an outlet nozzle.

The device herein described requires but little attention, it being necessary only to occasionally remove the filter 33 and immerse it in a bath of oil to wash off the dust particles adhering thereto and to thoroughly wet the fibrous material of which the filter is formed. For convenience in removing the filter 35, it is provided with a woven wire frame 50 which may be removed from the chamber 18 as a single unit and immersed in the oil bath. The centrifugal separating chamber requires no attention at any time during its operation owing to the fact that the collecting dust particles are removed therefrom, as they collect, by the ejector 35.

I claim as my invention:

1. An air cleaner comprising: a horizontally disposed cylindrical casing forming a separation chamber having a closed rearward end and an unobstructed cylindrical wall, said cylindrical wall adjacent said rearward end and at its lowermost point being provided with a dust outlet; an air inlet spaced forwardly from said dust outlet and tangentially disposed to cause the incoming air to rotate and effect a centrifugal separation of the dust contained therein; a forward closure wall having a central opening; an air outlet tube secured in said opening and axially extended into said chamber approximately to a transverse plane intersecting the axis of said air inlet, whereby the rotating air tends to move rearwardly to urge the separated dust towards the dust outlet before said air enters the air outlet tube; and means functioning to draw the separated dust from said chamber.

2. An air cleaner comprising: a horizontally disposed cylindrical casing forming a separation chamber having a closed rearward end and an unobstructed cylindrical wall, said cylindrical wall adjacent said rearward end and at its lowermost point being provided with a dust outlet; an air inlet spaced forwardly from said dust outlet and tangentially disposed to cause the incoming air to rotate and effect a centrifugal separation of the dust contained therein; a forward cone-shaped closure wall having a central opening; an air outlet tube secured in said opening and axially extended into said chamber substantially to a transverse plane intersecting the axis of said air inlet, whereby the rotating air tends to move rearwardly to urge the separated dust towards the dust outlet before said air enters the air outlet tube; and means functioning to draw the separated dust from said chamber.

In testimony whereof, I have hereunto set my hand at Los Angeles, California, this 29th day of November, 1922.

HERMAN H. GARNER.